FREQUENCY INTERLACING OF MULTI-VIDEO PROGRAMS

Filed Oct. 21, 1965 5 Sheets-Sheet 1

INVENTOR
HAROLD R. WALKER
BY John J. Rogan
ATTORNEY

FREQUENCY INTERLACING OF MULTI-VIDEO PROGRAMS

Filed Oct. 21, 1965 5 Sheets-Sheet 2

INVENTOR
HAROLD R. WALKER
BY John J. Rogan
ATTORNEY

Dec. 16, 1969 H. R. WALKER 3,484,544

FREQUENCY INTERLACING OF MULTI-VIDEO PROGRAMS

Filed Oct. 21, 1965 5 Sheets-Sheet 3

INVENTOR
HAROLD R. WALKER
BY John J. Rogan
ATTORNEY

Dec. 16, 1969 H. R. WALKER 3,484,544

FREQUENCY INTERLACING OF MULTI-VIDEO PROGRAMS

Filed Oct. 21, 1965 5 Sheets-Sheet 4

INVENTOR
HAROLD R. WALKER
BY John J. Rogan
ATTORNEY

FREQUENCY INTERLACING OF MULTI-VIDEO PROGRAMS

Filed Oct. 21, 1965 5 Sheets-Sheet 5

INVENTOR
HAROLD R. WALKER
BY John J. Rogan
ATTORNEY

United States Patent Office 3,484,544

Patented Dec. 16, 1969

3,484,544

FREQUENCY INTERLACING OF MULTI-VIDEO PROGRAMS

Harold R. Walker, Metuchen, N.J., assignor to Charger Electronic Systems Inc., New York, N.Y., a corporation of New York

Filed Oct. 21, 1965, Ser. No. 499,631

Int. Cl. H04n *1/44, 7/00*

U.S. Cl. 178—5.1 23 Claims

ABSTRACT OF THE DISCLOSURE

A television program multiplex system is described wherein a pair of programs are transmitted on a single allocated television channel and wherein one of the programs is secrecy-guarded by providing a selective phase inversion of the video signals. A pair of television cameras are directed at different subjects and produce video signals representative thereof. The cameras scan the subjects in synchronization with one another and the video signals obtained at the output of the cameras are selectively recombined in a frequency-interlacing manner after one of the camera signals is subjected to a processing wherein alternate line scans are phase-inverted. A specific phase inversion technique is described which phase-inverts pairs of frames. In addition, the inverted channel is subjected to selective frequency attenuation to further prevent interference between the frequency-interlaced channels. A receiver is described which utilizes these video signals for television display.

This invention relates to multiplex systems and more particularly to methods and apparatus for multiplexing electro-optical transmissions such as video signals and the like.

A principal object of the invention is to provide novel methods and apparatus for simultaneously transmitting a plurality of video programs from a single transmitter using a bandwidth normally required for a single video program.

Another principal object is to provide an improved method and apparatus for transmitting a plurality of separate video-aural programs whereby one of the video programs is specially coded so that it can be received and reproduced only with a special decoder.

Another principal object is to provide novel methods and apparatus for transmitting a plurality of distinct video-aural programs using a single assigned frequency channel which is normally required for a single video-aural program and wherein one of the programs is specially coded so as to enable it to be reproduced only with a corresponding special decoder.

A further object is to provide a method and apparatus for transmitting a plurality of distinct video programs over a single assigned frequency channel and by employing frequency interlacing techniques, and wherein the video signals of one program are specially coded prior to the interlacing operation so as to avoid so-called bleedthrough in the reproduction of that program.

Another object is to provide a novel method of frequency interlacing in a television system whereby the superposition of successive scanned frames can be effected so that visual bleed-through in the reproduced image can be avoided.

A feature of the invention relates to a viedo or similar transmission system incorporating novel methods and apparatus for coding successive line scans so that the original video image can only be satisfactorily reproduced by means of a special decoder, and by employing frequency interlacing techniques and thereby to enable a plurality of distinct video programs to be transmitted over a single frequency channel which is normally required for a single such program.

Another feature relates to a novel combination of a frequency interlacer and a line scan coder whereby a plurality of separate video programs can be transmitted over a single assigned frequency channel normally required for one of such programs.

A further feature relates to a novel line scan control arrangement for television transmitters and the like whereby the scanned frames are processed in successive pairs with the corresponding line scans in one pair being of opposite phase with respect to the corresponding line scans of another pair whereby the transmitted signal cannot be satisfactorily reproduced by conventional television receivers.

A further feature relates to a novel line scan control arrangement for television transmitters and the like whereby two distinct video subjects can be separately scanned in respective successive linear elements to produce respective composite video-sync signals, and the signals for one subject are processed with novel line scan coding to render them unsatisfactorily reproducible on conventional television receivers, and the said signals are also subjected to a frequency interlacing operation at the transmitter to avoid bleedthrough at the receiver which is otherwise equipped to reproduce the coded signals.

A further feature relates to novel methods and apparatus for producing composite video-sync signals representing two distinct video subjects, and wherein the sync signals for one subject are effectively deleted from one of the composite signals at the transmitter and the remaining video signals thereof are subjected to a line scan coding operation, whereupon both the video signals are subjected to a frequency interlacing operation prior to transmission.

A further feature relates to a novel line scan coding and decoding system for privacy guarded video transmission and the like.

A further feature relates to a novel line scan coding and decoding system also employing frequency interlacing at the transmitter for privacy guarding of the video transmissions.

A still further feature relates to the novel organization, arrangement and relative interconnection of parts which cooperate to produce an improved video transmission and receiving system.

Other features and advantages not specifically enumerated will be apparent after a consideration of the following detailed descriptions and the appended claims.

In the drawing which is given to typify certain embodiments,

FIG. 8 and FIG. 8*a* are series of graphs explanatory of the frame pairing control.

While the invention will be described in connection with a television system and referring to particular frequencies it will be understood such is done merely by way of illustration. For simplicity in explanation it has been assumed that the invention will operate in accordance with certain prescribed standards such as those of the Federal Communications Commission. However, as will be apparent to those familiar with the art, the invention in certain of its aspects is equally well applicable to any other video or video-aural system wherein the frequency bandwidth for the transmission of a given video program is limited. Thus the invention enables at least two such programs to be transmitted and reproduced within such bandwidth limitation, while at the same time providing privacy guarding for at least one of the said programs.

Figure 1:
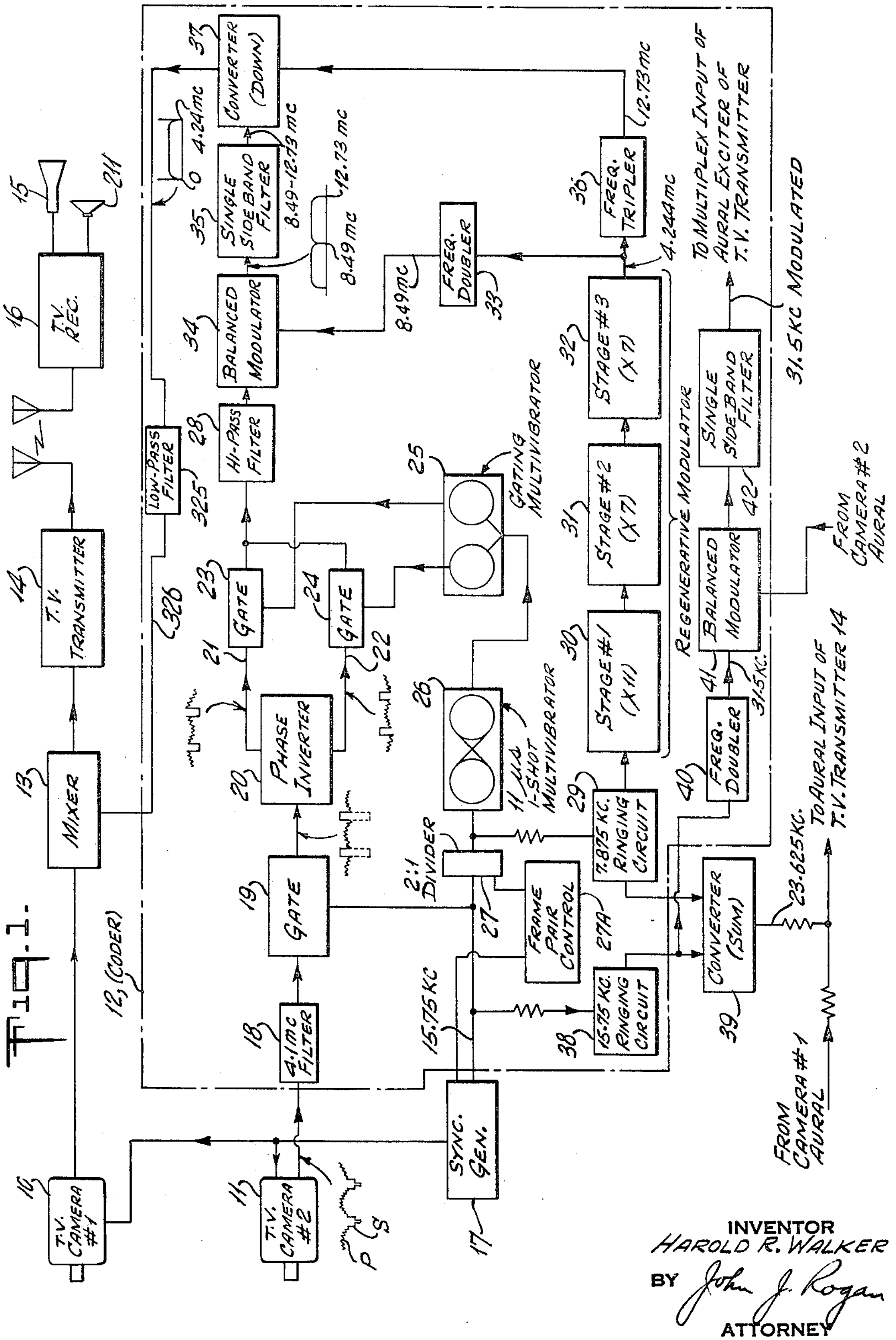
FIG. 1 is a schematic block diagram of a video multiplex system embodying the invention.

Referring to FIG. 1, the numerals 10 and 11 represent respective transducers such as television cameras for translating the shade values of respective television subjects into the usual composite video signals. Such signals are illustrated in graph F (FIG. 1A), and include the varying amplitude picture voltages designated P and the usual synchronizing and blanking pulses designated S. The envelopes of the video portions P are in the positive-going phase (i.e. with respect to shade variations of white to black) while the synchronizing and blanking pulses are in the negative-going phase. These signals can of course be transmitted by conventional transmission equipment and reproduced on any conventional television receiver in the manner well-known in the art.

Figure 1A:
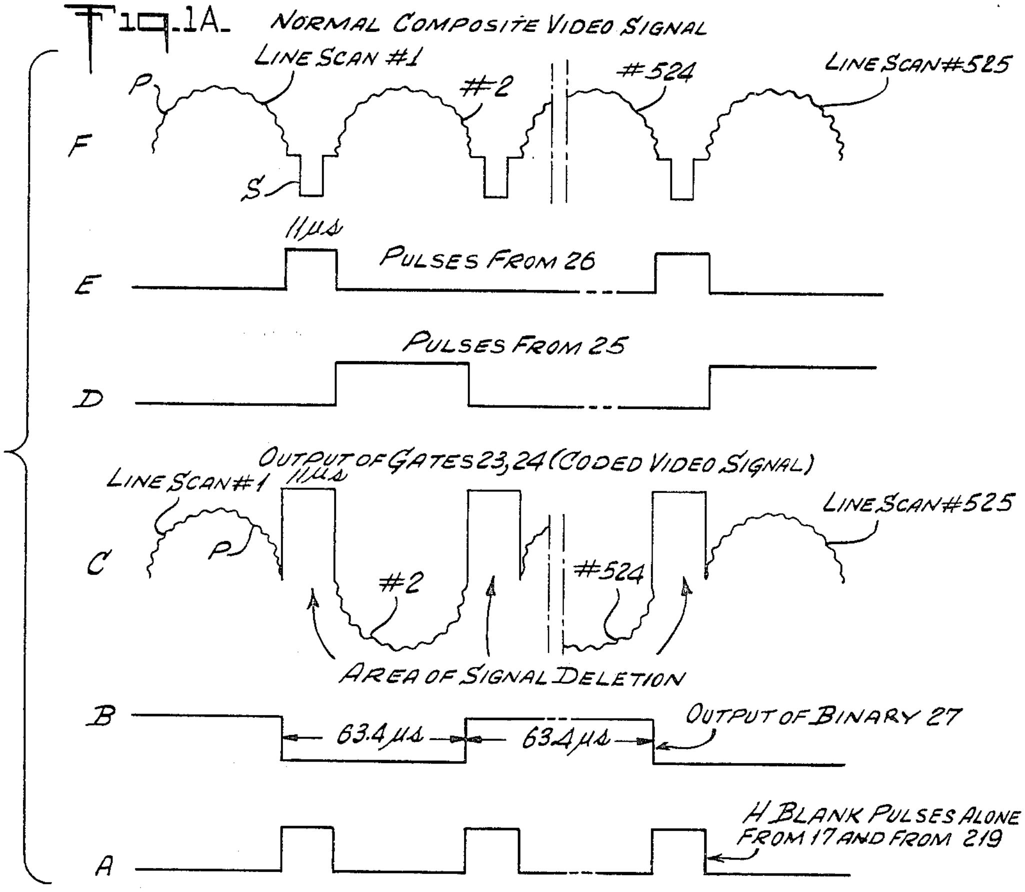
FIG. 1A is a series of graphs explanatory of the invention.

However, the composite signal from camera 11 is subjected to an encoding process in the encoder 12 so that the output of the composite signal from encoder 12 has the alternate video line-scan signal envelopes P in negative-going phase while the remaining alternate video line-scan envelopes remain in their normal positive-going phase as shown in graph C, FIG. 1A. The signal within the encoder 12 has the sync and blanking pulses removed, so that decoding at the reproducing end, requires the use of sync and blanking pulses from camera 10. The encoded signal is further acted upon by a high pass filter 28 which reduces the low frequency components and is then frequency inverted in a single sideband modulator 34 so that low frequencies now extend below a carrier of approximately 4.24 mc. In other words, the camera 10 produces a normal or standard composite video signal whereas the unit 12 connected to camera 11 produces a coded signal with the sync and blanking pulses deleted.

The standard composite video signal from camera 10, is in accordance with the invention, mixed with the encoded signal from unit 12 in a suitable additive linear mixer 13 of known circuitry. The signal from unit 12 is in the form of a specially chosen subcarrier frequency which has its unmodulated frequency within the frequency spectrum of the signals from camera 10, but so related as to be frequency interlaced as is done with chroma signals in the NTSC color T.V. system. This so-called frequency interlacing is well-known in the television art and is described for example in "Color Television Engineering" by Wentworth, page 230, et seq., and also in "Color Television Fundamentals" by Kiver, page 20, et seq. For reasons which become apparent in the ensuing circuit description, the said interlaced subcarrier has a frequency of 4.24 mc. According to this invention only the lower sideband of the modulated subcarrier is transmitted to represent the composite video signal from camera 11, and this is interlaced with the part of the video spectrum available for the composite video signal from camera 10. This selection of the lower sideband only, is an important feature of the present invention since it keeps the overall signal within the FCC standards of bandwidth.

Figure 4:
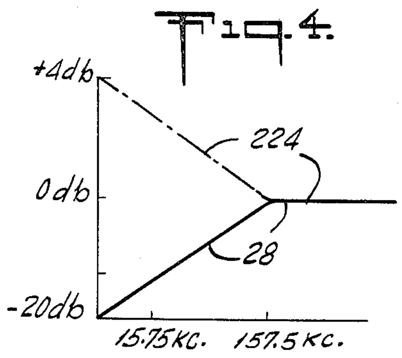
FIG. 4 is a graph of the characteristics of certain of certain of the filters for supplementary coding and decoding of the video signals.

According to the invention, therefore, it is possible to use a single assigned FCC television frequency channel to transmit and reproduce two completely independent subject matters. Thus the standard composite video signal from camera 10 can be received and accurately reproduced on the conventional television receiver, but the encoded signal from unit 12 is not visible on the screen of the receiving picture tube since, as will be explained hereinbelow, alternate scanned lines in the encoded signal will normally, unless decoded as hereinbelow described, cancel each other to render the subject invisible. This cancelling action is in addition to that provided normally by the cancelling action of a subcarrier so chosen that it is an odd multiple of one-half the line freqeuncy. This latter cancelling action has been thoroughly studied by many investigators and is described by Wentworth and Kiver referred to hereinabove. This double combination of cancelling actions according to the invention gives an image on picture tube 15 without any appreciable or recognizable bleed-through. This bleed-through has been one of the serious difficulties for effecting cancellation by frequency interlacing alone, as is explained in "Color Television Engineering" by Wentworth, page 213 (FIG. 8–4–C). I have found that in order to use the principle of frequency interlacing for transmitting two distinct subject-matters without bleed-through, it is necessary to process the signals from camera 11 in the novel way herein described before the interlacing step occurs. This processing is the function of the encoder 12. The control of the invisibility of the encoded subject-matter at the receiver is further assured by altering the spectral content of the encoded signal from the encoder unit 12, this being effected by a special high-pass filter 28 in the unit 12.

In order to render the encoded signal selectively visible on the picture tube of the receiver, the receiver also must include a decoding unit similar to unit 12 but acting in the inverse sense so as to reinvert the original inverted video line scan signals arising from unit 12 at the transmitter. It will be understood that each of the audio programs accompanying the respective video signals from cameras 10 and 11 will also be transmitted without interference over the single assigned television channel as will be described hereinbelow. Thus it is possible to transmit, without mutual interference, two distinct video-aural programs without exceeding the over-all bandwidth prescribed by the FCC for a single channel.

In order that the system operate for such dual transmissions over the same television channel, it is necessary to use a sync genertor 17 which is common to both cameras 10, 11. Alternatively each camera may have an individual sync generator providing both these sync generators are locked to the same sync frequency by any well-known means. The composite video signal from camera 11 is passed through a 4.1 mc. filter 18 the purpose of which is to prevent interference with the 4.24 mc. carrier which would cause objectionable lines in the picture, by preventing components around 4.24 mc. from causing beats. The output of filter 18 is then passed through a gate 19 where the synchronizing pulses and blanking pedestals are removed as indicated by the dotted portion, or alternatively and equivalently they are changed to a positive-going phase as indicated by the full lines. In accordance with the invention, these deleted or ineffective sync and blanking pedestals will be automatically restored in the decoding unit at the receiver 16 by utilizing the sync and blanking signals in the normal composite video signals from camera 10. The removal of the sync and blanking pedestals in the encoder at the transmitter helps to reduce the signal amplitude and thus prevent over-modulation when the two signals from cameras 10 and 11 are added in the mixer 13.

The video signal from camera 11 with the sync and blanking pedestals removed is then passed through a phase inverter 20 which has two outputs 21, 22. Output 21 is uninverted with respect to the input, whereas output 22 is inverted as indicated in FIG. 1. These two outputs are then passed through respective gates 23, 24. Gate 23 is synchronously gated so as to pass the uninverted signal only, while gate 24 is also synchronously gated to pass the inverted signal only. In order to time the gates properly they are controlled by a free-running multivibrator 25 which is triggered by a one-shot input pulse having a pulse width equal to the standard blanking pulse of 10 to 11 μs. This pulse appears at the output of a one-shot multivibrator 26 (see graph E, FIG. 1A). Multivibrator 25 is triggered from the trailing edge of the pulses from unit 26, which is triggered at one-half the standard line scanning frequency, that is 7.875 kc. This rate is controlled by a two-to-one dividing binary counter 27 which in turn is triggered by the horizontal blanking pulse from the sync generator 17. The effect of this triggering is that alternate line scan video signal envelopes are inverted or made in negative-going phase, and with the blanking and synchronizing pulses effectively deleted (graph C FIG. 1A); whereas the intervening alternate video line scan envelopes are uninverted or in positive-going phase.

The standard FCC system employ 525 scanning lines per frame. In accordance with the invention the corresponding video line scan signals alternating line by line for each succeeding pair of frames are in the same phase, whereas the corresponding video line scan signals for the next pair of frames are inverted in phase with respect to those of the preceding pair of frames. Thus line scans 1 and 525 of the first frame and line scans 526 and 1050 of the second frame will be in like phase and those corresponding overlying line scans will not cancel each other. However, in all frames the individual alternate line scan signals are inverted in phase. Line scans 1051 and 1575 of the third frame and line scans 1576 and 2000 of the fourth frame being inverted in phase and overlying the corresponding line scans of the two preceding frames will cancel out the entire image. The net result of this phase inversion of the lines and the frame-pairing of alternate pairs of frames is to render the video signals from the camera 11 invisible on the picture tube screen 15 at the receiver.

In order proprely to time the inversion of the lines of the alternate pairs of frames so that they cancel out the corresponding lines of the preceding pair of frames, the horizontal blanking pulses from source 17 are applied to a frame-pairing control unit 27A which will be described in detail in connection with FIG. 3. Suffice it to say that in the absence of unit 27A there would be a continuous alternation in phase of all line scan signals through the complete succession of frames. However, unit 27A produces a special re-set pulse at the end of the first frame of a given pair so that the last scanned line of that frame is in the same phase as the next succeeding scanned line, namely 1 line of the next frame of the same pair. This relation is clearly illustrated in FIG. 8A.

The inverted video signals representing all frames are passed through a high-pass R-C filter 28 which for example has an attenuation characteristic vs. frequency which is 3 db down at 157.5 kc. and is 20 db down at 15.75 kc., as indicated in the graph of FIG. 4. This reduces the signal peak-to-peak amplitude to about 15% of full signal swing without altering the high frequency energy content. For a more detailed description of the inverting of the alternate video envelopes by means of the elements 20–27, reference may be had to my co-pending application, Ser. No. 499,401 entitled "Coded Video Systems," filed on Oct. 21, 1965.

Figure 5:
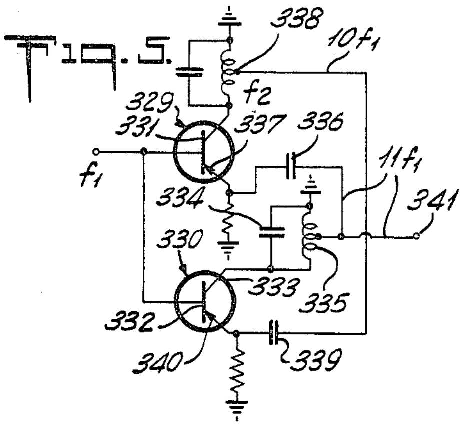
FIG. 5 is a detailed wiring diagram of a novel regenerative frequency multiplier used with the invention.

The output of the binary divider 27 is also applied to a ringing circuit 29 which generates a sustained ringing sine wave of 7.875 kc. This sine wave is applied to a series of three regenerative multiplier stages 30, 31, 32 to beat up the frequency to an output frequency of 4,244 mc. Thus the first stage 30 may have a frequency multiplication factor of 11 and each of the stages 31, 32 will have a respective frequency multiplication factor of 7. A typical and novel regenerative multiplier is shown in FIG. 5 and will be described hereinbelow.

In accordance with the invention the 4.244 mc. signal from the stage 32 is used as a subcarrier for frequency interlacing in the frequency spectrum of the particular television channel at which the system is operating. The principle of frequency interlacing is well-known in the television art. As is also well-known, by reason of the inherent characteristics of the system, the fundamental line frequency is the critical or root frequency. In other words, while the television signal may occupy a band of 0–4 mc., the signal energy does not exist continuously between the band ends but exists in what are known as bundles or clusters, as described for example in chapter 2 of "Color Television" by Kiver. Each of such bundles is separated from adjacent bundles by 15.75 kc. In the so-called empty spectrum spaces between adjacent bundles, other signals can be inserted. Thus in the NTSC color television system the so-called chrominance signals are interlaced using a double sideband modulation scheme. According to the present invention the 4.244 mc. signal from unit 32 is converted to a single sideband suppressed carrier which is interlaced in the "empty spaces" in the frequency spectrum of the normal video signals corresponding to camera 10.

In order to achieve the proper modulation and sideband filtering the 4.244 subcarrier is doubled in a frequency doubler 33 to produce a frequency of 8.94 mc. which is applied to a balanced modulator 34 together with the attenuation coded video signals from filter 28. This produces a double sideband carrier of 8.49 mc. with the sidebands extending ±4.10 mc. The carrier is removed by the balanced modulator and the lower sidebands are filtered out in a suitable sideband filter 35, leaving only the upper sideband 8.49 to 12.73 mc. It should be noted that the video signal from camera 11 has been previously limited to about 4.1 mc. by filter 18.

A portion of the 4.244 mc. subcarrier is also subjected to a frequency tripling in the tripler 36. The resultant 12.73 mc. signal is beat in a frequency converter 37 with the said remaining sideband from filter 35 to produce a frequency inversion, namely a signal lying in a band between 0 and 4.244 mc. In other words, carrier-suppressed 4.244 mc. subcarrier is modulated to produce only one sideband representing the video signals from camera 11. This modulated subcarrier which now occupies the empty space between successive energy groups of the video signal from camera 10, is mixed with the standard signal from that camera to produce a frequency interlaced signal wherein certain alternate energy groups occupy a harmonically related frequency space in the channel spectrum.

For the purpose of synchronizing the line alternations associated with each of the respective two video programs, the 15.75 kc. horizontal blanking pulse from unit 17 is applied to a ringing coil 38 to generate a sustained 15.75 kc. sine wave, and a portion of the 7.875 kc. signal from unit 29 is beat therewith in converter 39 to produce a sustained sine wave of 23.625 kc for sync purposes. This latter sine wave is not audible and is mixed with the aural program associated with camera 10 and is applied to the usual aural input section of the transmitter 14 in the well-known manner.

In order to transmit the aural signals associated with camera 11 a portion of the 15.75 kc. signal from unit 38 is doubled in frequency in the doubler 40 and is applied to a balanced modulator 41 together with the aural signals associated with camera 11. The lower sidebands are filtered out in the sideband filter 42 leaving a single sideband up from 31.5 kc. and with the carrier suppressed. This modulated sideband is then applied to the usual aural exciter multiplex input of transmitter 14 in accordance with standard practice in FM transmitters such as those used in FM stereo transmissions and SCA service as approved by the FCC.

Figure 2:
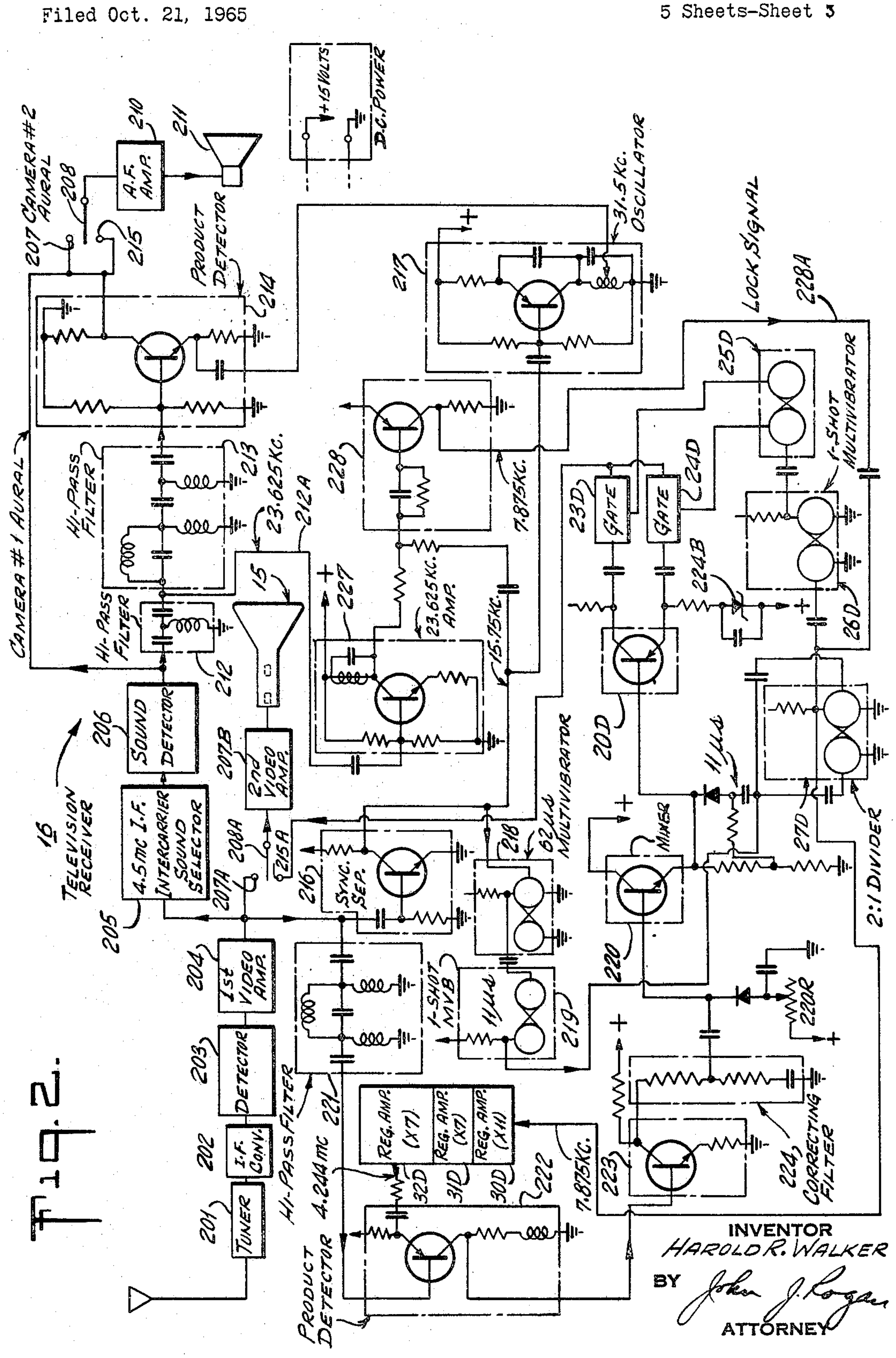
FIG. 2 is a schematic block diagram and wiring diagram of a video receiver embodying certain features of the invention.

Referring to FIG. 2 there is shown in schematic block diagram form a receiving system which is capable of receiving both programs arising at cameras 10 and 11. It includes the usual television front end including the channel tuner 201, the IF converter 202, detector 203, and first video detector amplifier 204. The amplified video signal has for example a spectrum of 5.75 mc. above the low frequency limit of the selected channel. In the standard FCC system the video carrier begins at 1.25 mc. above the said low frequency limit of the selected channel and occupies a bandwidth of 4.24 mc.

In the known manner, the aural program is taken off in the usual 4.5 mc. intercarrier sound IF unit 205 and the aural modulations are detected by the usual sound detector 206. The sound IF amplifier and detectors must pass ±45 kc. to prevent distortion or to produce the desired sound fidelity. The sound corresponding to camera 10 is taken off from detector 206 and applied to one of the fixed contacts 207 of a two position switch whose switch arm 208 is connected to the audio frequency amplifier 210 and loud speaker 211 of the television set 16.

The sound corresponding to camera 11 as hereinabove described is a single sideband of the multiplex aural carrier 31.5 kc. which passes through the high-pass filter 212. This filter is designed to filter out all frequencies below 15 kc. which latter represent the sound from camera 10.

The composite video signal from amplifier 204 is passed through a sync separator 216 to separate out the horizontal synchronizing pulse H which is used to lock a 31.5 kc. oscillator 217 for the sound detection in connection with the coded picture channel. This oscillator output is applied to the product detector 214 to detect the single sideband of the aural program associated with camera 11 which can then be applied through switch arm 208 and contact 215 for sound reproduction purposes.

It should be observed at this point that in the transmitter of FIG. 1 the coded video signals from unit 12 have the sync and blanking pulse pedestals deleted; however, the normal composite video signal including the sync and blanking pulse pedestals associated with camera 10 are present in the output of video amplifier 204. According to the invention the deleted sync and blanking signals for the coded channel are inserted and supplied from the sync and blanking signals of the uncoded channel.

To accomplish this, they are reconstructed as described hereinbelow and added to the decoded video which is detected as follows. The output from the video detector and amplifier 204 is passed through a high-pass filter 221 to remove the high energy low frequency components which exist in the transmitted video arising from camera 10. The output of filter 221 is then applied to a product detector 222 which is also supplied with a local 4.244 mc. subcarrier corresponding to the above mentioned interlaced subcarrier. This local 4.244 carrier is generated in a three-stage regenerative multiplier chain 30D, 31D, 32D, having successive frequency multiplication factors of 11, 7 and 7. The input of stage 30D is a 7.875 kc. signal which is obtained from the two-to-one divider 27D driven by the 11 μs. signal from 219. The 7.875 kc. pulse from divider 27D also controls the gating multivibrator 25D through the 11 μs. one-shot multivibrator 26D as described in detail in said application Ser. No. 499,401 filed on even date herewith so as to alternately gate on the devices 23D, 24D.

The output of detector 222 is the coded video signal from camera 11 without the necessary horizontal blanking and sync pulses. It is amplified in video amplifier 223 and then passed through a correction filter 224 which has a transmission characteristic designed to restore the originally reduced low frequency components at the transmitter. In other words, filter 224 has the opposite or complementary attenuation characteristics to that of filter 28 (FIG. 1). The corrected video signal from filter 224 is then applied to the mixer 220 to which is also applied the reconstituted horizontal blanking and sync pulse from unit 219.

The reconstituted sync and blank pulses are obtained as follows. The separated sync pulses from unit 216 are also applied to drive a 62 μs. multivibrator 218 whose pulses (graph B FIG. 1A) are applied to a one-shot multivibrator 219. This delivers 11μs. pulses, (graph A FIG. 1A) which are used to control gates 23D and 24D that function similarly to gates 23, 24 of FIG. 1. In this connection it should be observed that elements of FIG. 2 which are similar to corresponding elements of FIG. 1 bear the same designation numerals as in FIG. 1 but with the suffix D.

The trailing edge of the pulse from unit 218 triggers on the unit 219 to produce the 11 μs. pulse which represents the new horizontal blanking and horizontal sync pulse as explained hereinbelow. This locally generated blanking and sync pulse is inserted in the encoded video signal to take the place of the corresponding pulses deleted at the transmitter. These reconstituted blanking and sync pulses are added in the mixer 220 with the detected coded video signal from the output of amplifier 223.

The detected video signal from detector 222 is amplified by 223, phase and amplitude corrected by 224 and clamped by the diode 224A connected to the base of mixer transistor 220 to restore its D.C. potential so that it closely duplicates the original signal. The composite video signal at the output of the phase inverter 20D now contains the video modulations as well as the horizontal blanking and sync pulses necessary for the reproduction of the video signal. This composite encoded video signal from the phase inverter 20D is passed through the inverting gates 23D and 24D. Gate 23D passes the composite signal in phase with the signal from unit 220 but gate 24D inverts the signal. In other words, the video signals which had been originally inverted at the transmitter have been reinverted so that the output of gates 23D, 24D is a duplicate of the composite video signal associated with camera 11.

The reconstituted composite video signal is applied through switch contacts 215A and switch arm 208A to amplifier 207B so as to enable the subject matter from camera 11 to be faithfully reproduced on picture tube 15. Switch arms 208 and 208A are ganged together. When arm 208A engages fixed contact 207A it connects the second video amplifier 207B in circuit with the first video amplifier 204 and with the picture tube 15 to reproduce the video from camera 10. At the same time arm 208 engages contact 207 and connects the AF amplifier 210 to the detector 206. When arms 208 and 208A are moved to their other position the picture tube 15 is connected through contacts 208A and 215 to reproduce the video program from camera 11. Thus by manipulating switch 208–208A either the coded video and its aural program can be reproduced, or the uncoded video and its aural program can be reproduced.

It should be noted that the 23.625 kc. signal taken off from filter 212 is applied over conductor 212A and is amplified in the ringing amplifier 227 whose output is mixed with the stripped 15.750 kc. horizontal sync pulses from the sync separator 216 to produce a 7.875 kc. pulse group which after suitable amplification in amplifier 228 is applied over conductor 228A to the multivibrator 27D to keep it in step. This prevents the possibility of reproducing a negative picture should the transmiter and receiver gating multivibrators 25 and 25D get out of step because 27 at the receiver is thus locked in phase with the corresponding unit at the transmitter. This also makes unnecessary at the receiver, a frame pairing control such as 27A at the transmitter since divider 27D follows exactly the phase of the divider 27 as acted upon by the control unit 27A as the transmitter encoder.

Figure 3:
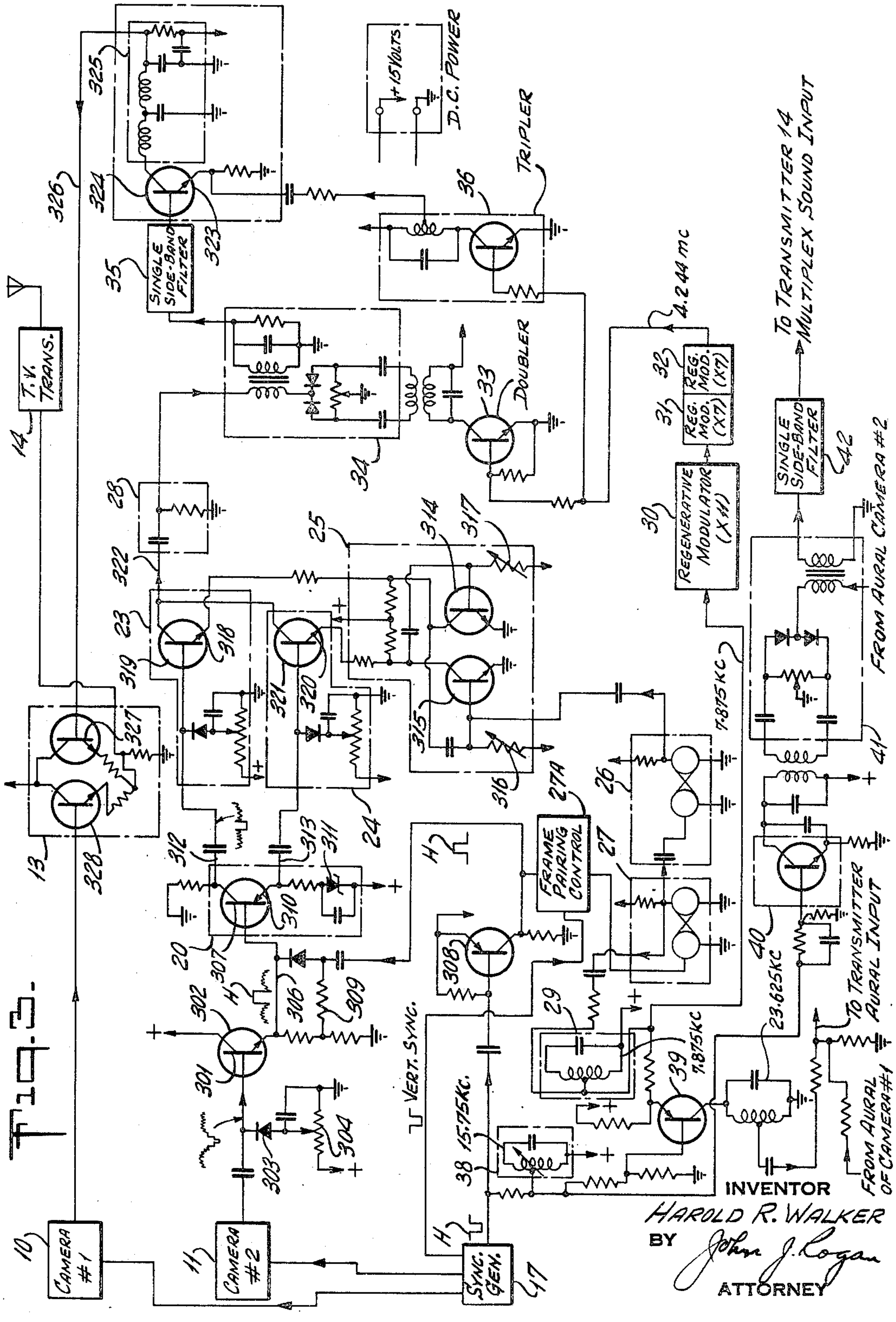
FIG. 3 is a more detailed wiring diagram of the transmitter of FIG. 1 showing the coding and frequency interlacing parts in more detail.

Referring to FIG. 3, a more detailed wiring diagram is given for the system of FIG. 1 and especially of the encoder 12. The parts which correspond in FIGS. 1 and 3 are designated alike. Thus the composite video signal from camera 11, to be encoded, is applied to the base 301 of a driver transistor 302 of the emitter-follower kind. The input video pulse is clamped by the diode 303 and its associated adjustable potentiometer 304 to establish reference D.C. potential for the output. The driver 302 drives the phase inverter 20. Thus the video signal is applied over conductor 306 to the base 307 of the inverter 20. The blank and sync pedestals in the composite video signal, which normally are in a "downward" or negative going phase are effectively deleted. For that purpose the horizontal blank pedestals H from the generator 17 are amplified and inverted in an inverting transistor 308. The inverted pedestals are then applied through diode 309 to the base 307 of phase inverter 20. The signal at base 307 is therefore as indicated adjacent the conductor 306.

Transistor 307 has its emitter 310 connected to ground through a Zener diode 311 which limits the voltage excursion of the transistor 307 in the cut-off direction. In other words, 307 is driven beyond cut-off and has the peak of the inserted bank pedestals cut off. By adjusting potentiometer 304, the level at which clipping occurs can be controlled. The next result is that the signal applied to the base 307 has the blank and sync pedestals effectively removed from the composite video signals and the D.C. level of the replacing signal is controllable by 304.

Figure 6:
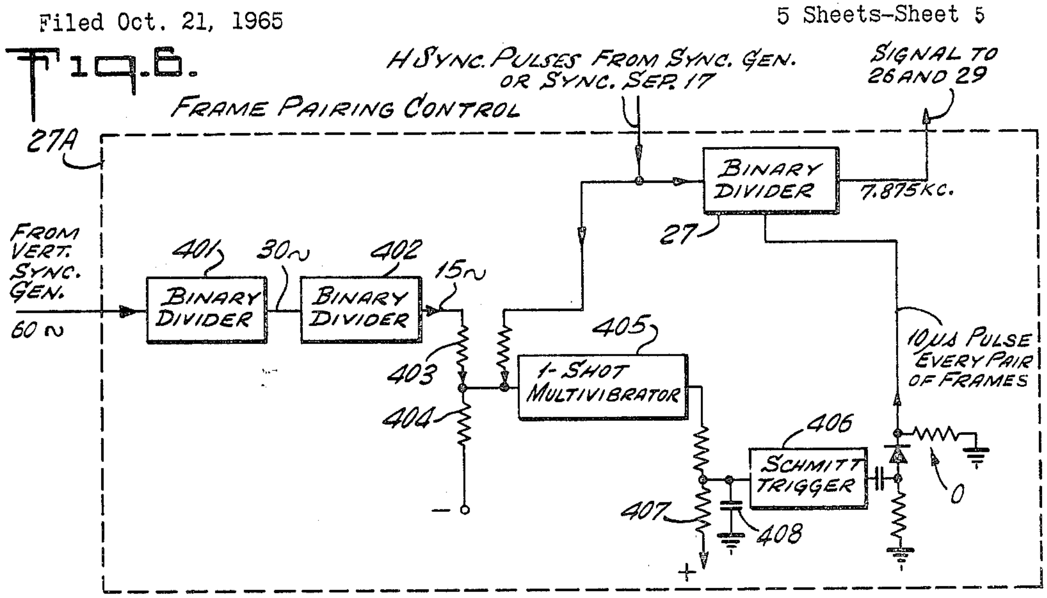
FIG. 6 is a detailed block and wiring diagram of the frame pairing control feature of the invention.
Figure 7:
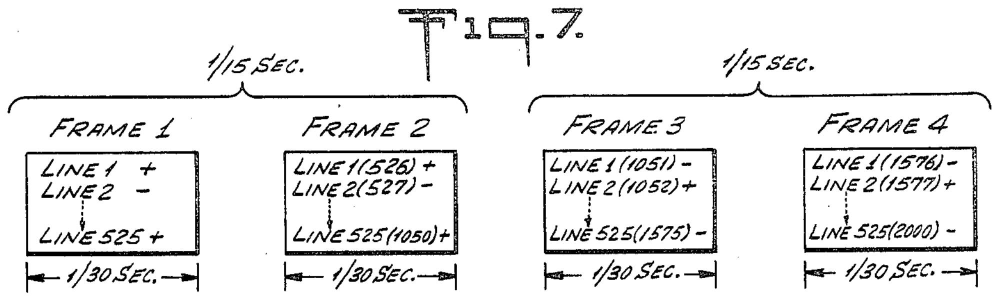
FIG. 7 is a diagram explanatory of the frame pairing technique of the invention.
Figure 7:
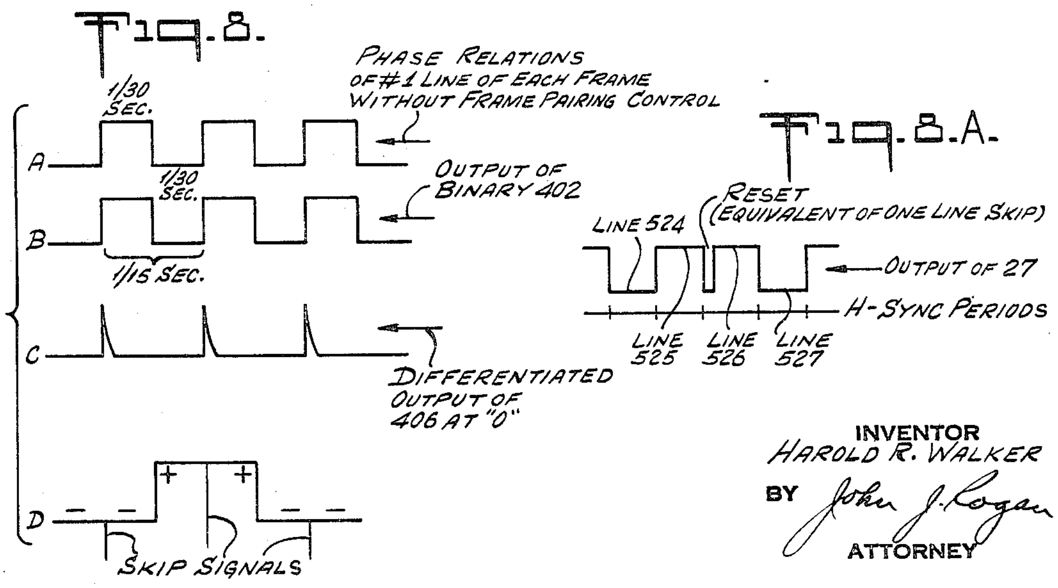

Invester 20 passes to its output conductor 313 the remaining video signal envelopes in phase with the input, and passes to the output conductor 312 video signals inverted in phase with respect to the input as described in detail in said application Ser. No. 499,401 filed on Oct. 21, 1965. Gates 23 and 24 are controlled in conductivity by the gating multivibrator 25 comprising for example a pair of transistors 314, 315 for producing respective square-shaped wave timing signals (see graph D FIG. 1A). The device 25 thus renders the gates 23, 24 alternately conductive to the alternate uninverted video signals and the alternate intervening inverted video signals. As explained hereinabove, the system is preferably so arranged that the cancellation of the superposed video line scans occur at only every succeeding pair of frames. For that purpose, there is provided the frame-pairing control circuit 27A which is shown in FIG. 6. In order to understand the purpose of this frame-pairing control, it should be noted that in my co-pending application filed on even date herewith (Case CHG–101), entitled Coded Video Systems, the phase of the individual video line scan signals are such that the line scans in any given frame overlie and cancel the corresponding linescans in the next preceding frame. I have found that in order to effect the dual channel transmission so as to prevent any bleeding through of the images from the two channels in the picture tube of the television receiver, it is necessary to arrange the inversion of the lines so that they cancel each other only at every succeeding pair of frames. This relation is schematically illustrated and explained in connection with FIG. 7. Frame 1 for example has the alternate line scan reversed in phase as explained in my said co-pending application so that line 1 and 525 are positive and the intervening lines of that frame are negative. However, according to the present invention, frame 2 is scanned so that the first and last line (lines 526 and 1050) are also positive, so that when the lines of frame 2 are superposed on the lines of frame 1 they do not cancel. However, with respect to frame 3, the circuits are arranged so that the first and last lines (lines 1051 and 1575) instead of being in positive phase as in frames 1 and 2, are in negative phase. It will be understood, of course, that the intervening scanned lines in frame 3 are in positive phase, similarly the first and last scanning lines of frame 4 (lines 1576 and 2000) are also in negative phase similar to those of frame 3. Since each frame is scanned in $\frac{1}{30}$ of a second it is clear, therefore, that the cancellation of the supposed lines occurs every $\frac{1}{15}$ of a second.

The frame pairing control circuit is shown in detail in FIG. 6.

The common sync generator 17 provides a 60 c.p.s. vertical sync pulse. This 60 cycle vertical sync signal is applied to a 2:1 divider binary 401 to produce a 30 cycle square wave signal, and thence in another 2:1 binary divider 402 to produce a 15 c.p.s. square wave signal. The output of divider 402 is applied to the voltage divider resistors 403, 404 and controls a one-shot $\frac{1}{25}$ second multivibrator 405. Normally 405 is held at cut-off by the negative bias through resistor 404. However, the positive 15 cycle square wave from divider 402 opposes the said normal negative bias and causes multivibrator 405 to be biased closer to conduction. Being so close to conduction, the first horizontal sync pulse to come along, triggers 405 on. The square wave output from 405 is applied to a Schmitt trigger 406 which operates from the leading edge of each of the square waves from 405. The Schmitt trigger is delayed slightly (about 20 μs.) by the R–C circuit 407, 408. When the Schmitt trigger fires, it feeds a pulse to the binary 2:1 divider 27 causing that divider to change state prematurely. This premature shift of the divider 27 causes the first line of the scanned frame to be in the same phase as the last line of the next preceding frame. Because of the above mentioned 15 cycle rate, this shift occurs at each alternate pair of frames. The relation between the various timings of the pairing control arrangement are shown by graphs A–E in FIGS. 8 and 8A. Graph A represents the phase of the scanning of the odd lines of each frame in the absence of the pairing control, from which it will be seen that the phases of the corresponding odd lines in the successive frames would be opposite, each frame of course having a duration of $\frac{1}{30}$ of a second. Graph B shows the corresponding timing of the square wave output of binary 402. Graph C represents the timing of the differentiated output of the Schmitt trigger 405. Graph D represents the phase of the first scanned and all odd lines in each successive pair of frames. Graph E represents the phase of the video signal from the last line of one frame and the first line of the next succeeding frame.

As explained in my said co-pending application, the device 25 (FIG. 3) is controlled so as to have alternate long and short output periods whose duration can be pre-set by means of the adjusting potentiometers 316, 317. Unit 25 is of the free-running kind so that when it is triggered on it delivers one of its outputs to the emitter 318 of gate 319 and by multivibrator action it then switches its other output to the emitter 320 of the gate 321. For convenience of descripion the gate 319 may be considered the normal gate in the sense that it passes the video signals in normal or negative phase whereas the gate 321 passes the video signals in the inverted or positive phase. As explained in said copending application, device 26 delivers the 10 μs. square pulse of 7.875 kc. (graph E, FIG. 1A) and each trailing edge of such pulse triggers the device 25. Thus device 25 when triggered on, will deliver a pulse for example of 53 μs. to the gate 319. By multivibrator action device 25 shifts to the other or long output and applies a gating pulse to gate 321.

As is clear from the graph D of FIG. 1A, the on and off periods of gates 319 and 321 are timed with the composite video signal so that the resultant output at the gates 23, 24 applied to the common conductor 322 is represented in graph C, FIG. 1A. This alternate gating action is repeated for each successive line of a given frame, for example frame 1, but at the beginning of line 526 (first line of next frame or second frame), instead of that line being represented by a negative phase signal it is represented by a positive phase. However, at the end of two such frame scans, the frame-pairing control 27A shifts the divider 27 so that instead of gate 319 being open to represent a normal or negative phase line scan, gate 321 is open to produce a negative phase. The foregoing frame-pairing operation is repeated for each successive pair of frames.

The H sync signals from generator 17 are also applied to the 15.750 kc. ringing circuit 38 which is connected to the base of the transistor converter or mixer 39. Also applied to the emitter is a part of the 7.875 kc. signal from divider 27 by means of the 7.875 kc. ringing circuit 29. The resultant sum beat frequency of 23.625 kc. is selected and mixed with the audio program signals associated with camera 10 to produce an electrical sum, as distinguished from a beat, which sum is used to control the decoding circuit in the receiver as described in connection with FIG. 2.

The 15.75 kc. signal from circuit 38 is also applied to a Colpitts oscillator 40 whose output is applied to the balanced modulator 41 where it is modulated with the aural program signals associated with camera 11. The output of the balanced modulator is connected through the single sideband filter 42 to produce a suppressed carrier single sideband signal which can then be applied to the multiplex input of the conventional aural excitation portion of transmitter 14. As hereinabove pointed out in connection with FIG. 1, the 7.875 signal from circuit 39 is subjected to three successive frequency multiplication stages 30, 31, 32 to produce the interlacing subcarrier frequency 4.244 mc. This subcarrier frequency is then frequency doubled in the transistor frequency doubler 33 whose output is applied to the balanced modulator 34. The subcarrier frequency is also trebled in frequency in the frequency trebler 36. Also applied to the balanced modulator 34 is the alternately line-scan inverted video signal from conductor 322. However, this signal prior to application to the modulator 34 is passed through the high-pass filter 28 to delete the low frequency components as hereinabove described.

The output of the modulator 34 is then passed through the sideband filter 35 to delete the lower sideband. The carrier is removed by the balanced modulator action. The trebled frequency from device 36 is applied to the emitter 323 of the transistor 324 in mixer 35 where it is beat with the single sideband signal from device 35 and passed through a low-pass filter 325 to apply to the conductor 326 the lower sideband extending from 0 to 4.244 mc. Thus the signal on conductor 326 is a subcarrier of 4.244 mc. which is modulated by the alternate inverted envelopes of the video signal associated with camera 11. This encoded signal is then applied to the base 327 of the dual transistor mixer network 13, the other transistor 328 of which has its base connected to the normal or unencoded video signal associated with camera 10. The composite mixed output from mixer 13 is then applied to the usual video section of the transmitter 14.

Referring to FIG. 5 there is shown a novel form of regenerative modulator that may be used for the elements 30, 31, 32 (FIG. 1 and FIG. 3) or the elements 30D, 31D, 32D (FIG. 2). It comprises a pair of transistor converters 329 and 330 having their base electrodes 331, 332 connected in common to a source of input frequency $f_1$. The collector electrode 333 is connected to the negative terminal of the direct current supply through a tank circuit consisting of capacitor 334 and inductance 335 which are tuned for example to a frequency of $11f_1$. This $11f_1$ frequency is tapped off at the midpoint of inductance 335 and is coupled through condenser 336 to the emitter electrode 337 where it mixes with the input frequency $f_1$ to produce a difference frequency $10f_1$. This $10f_1$ frequency is tapped off at the point 338 and is fed back through condenser 339 to the emitter 340 where it mixes with the input frequency $f_1$ to produce the sum frequency $11f_1$ which appears at the output terminal 341. Because of the high Q of the tank circuit 334, 335 both frequencies $f_1$ and $10f_1$ do not appear at terminal 341. This $11f_1$ frequency, of course, is regenerated again in the circuit. As long as the over-all conversion gain of the system is greater than one, the circuit regenerates at the multiple frequency, namely $11f_1$. It will be utilized to produce any multiple factor of the input frequency depending upon the tuning of the two tank circuits.

While certain specific frequencies, circuit values and components have been mentioned herein, it will be understood that they are given merely for explanatory purposes, and various changes and modifications can be made in the disclosed embodiments as will be apparent to those familiar with the art.

What is claimed is:

1. A method of video transmission which includes the steps of scanning two subjects in successive frames at the same line scan rate to generate respective composite video signals having synchronizing pulses and scan lines inverting the phase of alternate line scan signals representing one subject only, and electrically interlacing the signals representing both subjects.

2. The method according to claim 1 in which the interlaced signals representing said one subject are received and subjected to a phase re-inversion to render all the line scan signals representing the said one subject in like phase.

3. The method according to claim 1 in which the interlaced signals representing both said subjects are transmitted within the same frequency bandwidth normally required for only one subject.

4. The method according to claim 3 in which the said phase inversion of the line scan signals representing the said one subject is effected prior to said frequency interlacing.

5. The method according to claim 3 and further including removing synchronization pulses of the composite video signals representing the said one subject prior to transmission, transmitting the video signals representing both subjects, receiving both transmitted signals, inserting at the receiving end into the sync deleted signals representing said one subject sync components derived from the received composite video signal representing the second subject, and subjecting the alternate line scan signals components in the received signals representing said one subject to a phase re-inversion whereby all the line scan signals in the reconstituted composite video signal for the said one subject are all in like phase.

6. A method of transmitting two distinct video subjects within the frequency spectrum band normally required for one subject, which comprises translating the lights and shades of both subjects into respective discrete composite video line scan electric signals wherein the frequency spectrum for one subject comprises spaced groups of harmonically related frequencies and with successive line scan signals for both subjects being normally in the same phase with respect to a reference base voltage, inverting the phase of alternate line scan signals representing one subject only, and mixing the two sets of signals representing both subjects to produce a single output carrier wherein the frequency spectrum representing the two subjects are frequency interlaced.

7. An apparatus for the transmission within a selected bandwidth of a pair of television signals respectively representative of a first subject and a sound subject with the signals of one of the subjects being secrecy-guarded, comprising a pair of television cameras respectively directed at the first and second subjects and each producing video output signals in the form of line scan signals arrangeable in frames to form a composite video signal for transmission to a receiver with the video output signals from one of the television cameras being frequency modulated for transmission, means for generating a common synchronizing signal at a line scan frequency to control the scanning of the pair of television cameras in synchronization with one another, means for inverting selected video line scans from the other of the television cameras to provide mutual cancellation thereof upon reception by a television receiver tuned to display the uninverted video output signals from the one camera, frequency modulating means responsive to the inverted video line scan for producing a frequency modulated interlacing signal at a frequency selected to permit combining with the output from the one television camera in non-interfering relationship therewith, and
means for combining the frequency modulated signals from the one television camera with the frequency modulated interlacing signal to produce a composite transmission signal within said selected bandwidth.

8. The apparatus according to claim 7 and further including means responsive to the video output signals from the other camera for effectively deleting the sync components thereof and retain like scan signals for inversion by said inverting means.

9. The apparatus according to claim 7 wherein the inverter means further includes a frame pairing control circuit to invert the phase of the line scan signals for alternate pairs of frames thereof.

10. The apparatus as recited in claim 7 and further including
means responsive to the composite transmission signal for selecting the frequency modulated interlacing signals and producing a video signal representative thereof,
a television reproducing screen for displaying the interlacing signals with succesive line scans,
means responsive to the received video interlacing signal for reconstructing an uninverted video output signal representative of the video output from the other camera and means for applying the reconstructed video signal to said television screen for display thereby.

11. The apparatus according to claim 7 and further including means for selectively attenuating the inverted line scan signals to attenuate the lower video frequencies thereof at a different degree from the higher frequencies thereof.

12. The apparatus according to claim 11 wherein said attenuating means comprises a high pass filter having a break frequency selected to provide a predetermined attenuation of the low frequencies to further reduce interference from the frequency modulated interlacing signal at a receiver tuned to display the uninverted video output signals from the one camera.

13. Apparatus for video transmission which comprises, means to scan a subject in successive frames at the same line scanning rate to produce a composite video signal including sync pulses and video line scan signals, means to invert the phase of predetermined line scan signals with reference to a predetermined base reference voltage, the last mentioned means including a sync separator, a phase inverter and a pair of gates, a timing circuit for said gates to render them alternately conductive whereby one gate passes the uninverted video signals and the other gate passes the inverted video signals, means controlled by the separated sync pulses to derive therefrom a local subcarrier, and means to modulate said subcarrier by the signals from said gates.

14. Apparatus according to claim 13 in which a filter is provided for said gates to filter out the lower frequency components of the video signals applied to said gates.

15. Apparatus according to claim 13 in which means are provided for suppressing from said modulator the said subcarrier and one sideband thereof.

16. Apparatus for video transmission which comprises, means to scan two discrete subjects in successive frames at the same line scanning rate to provide a first composite video-sync signal representing the first subject, and to produce a separate composite video-sync signal representing the second subject, a sync separator, means to invert the phase of the sync pulses only in said second composite signal, a pair of gates, means to invert the phase of predetermined line scan signals only for the second subject with reference to a predetermined base reference voltage one of said gates being arranged to pass the uninverted signal and the other to pass the inverted signal, a timing circuit for controlling the timed opening of one gate with respect to the opening of the other gate, circuit means including said separated sync pulse to control said timing circuit whereby the output of said gates consists of successive video line scan signals without effective sync pulses, means to generate a local interlacing subcarrier, means to modulate said subcarrier by the signals from said gates, a mixer network and means to apply to said mixer network the video signals representing the first subject and the video signals from said modulator to produce a signal spectrum wherein the signals representing the first subject are frequency interlaced between the signals representing the second subject.

17. In a system for transmitting two distinct television programs utilizing a single assigned television channel band, the combination of a first television camera, a second television camera, a single television transmitter, means to code output from the second camera whereby alternate line scan signals are phase-inverted with respect to the intervening line scan signals, a subcarrier channel, means to modulate said channel with the said coded signals, mixture means for electrically interlacing the signals from the first camera and the subcarrier modulated signals from the second camera, and means to modulate said television transmitter by the said frequency interlaced signals.

18. A system according to claim 17 in which the said subcarrier has a frequency spectrum whose width is substantially the same as that normally required to transmit only one of said programs.

19. A system according to claim 17 in which a balanced modulator is provided for converting said modulated subcarrier into a corresponding single sideband carrier prior to mixing the subcarrier output with the signal from the first camera.

20. A system according to claim 17 in which the said coded output from the second camera is connected to an attenuating network having a non-linear frequency distorting characteristic.

21. A system for transmitting and receiving two distinct television programs utilizing a single assigned television frequency channel comprising in combination
means for generating two distinct video signals, each representative of one of said programs with the video signal of one program being selectively coded with alternating scan lines of inverted phase, both of said video signals being composed of scanning signals at a selected line frequency and aural frequency program signals,
means for deriving from the line frequency scanning signal a first subcarrier signal, and a second subcarrier signal,
means for modulating the first subcarrier signal with the aural frequency program signal from one of said programs,
means for modulating the second subcarrier signal with the aural frequency program signal from the other of said programs,
means for frequency-interlacing said video signals and said modulated first and second subcarrier signals,
a video reproducer,
means for receiving and selecting said coded video signal,
means for re-inverting said received coded video signals to restore the line scans of said one program to like phase, and
means for applying the decoded re-inverted signal to said video reproducer to reproduce said one program.

22. A video television coding system comprising means for producing video line scan signals representing successive video frames, means for inverting the phase of alternate intervening line scan signals in each frame, a frame pairing control circuit, and means controlled by said frame pairing control circuits for maintaining the line scan signals in each successive pair of frames in the same phase, while maintaining the line scan signals in the next succeeding pair of frames of opposite phase to those of the preceding pair of frames.

23. The video coding system according to claim 22 and further including a sync generator driving said pairing control circuit and a gated phase inverter driven by the frame pairing control circuit for controlling said phase inversions of said alternating intervening line scan signals.

References Cited

UNITED STATES PATENTS

| | | | |
|---|---|---|---|
| 2,045,796 | 6/1936 | Plebanski | 325—153 |
| 2,311,796 | 2/1943 | Wrathall | 325—153 |
| 3,069,492 | 12/1962 | D'Agostini | 178—5.1 |

ROBERT L. GRIFFIN, Primary Examiner

HOWARD W. BRITTON, Assistant Examiner

U.S. Cl. X.R.

178—6